United States Patent
Zhou et al.

(10) Patent No.: US 7,426,328 B2
(45) Date of Patent: Sep. 16, 2008

(54) VARYING REFRACTIVE INDEX OPTICAL MEDIUM USING AT LEAST TWO MATERIALS WITH THICKNESSES LESS THAN A WAVELENGTH

(75) Inventors: Yan Zhou, Pleasanton, CA (US); Seng-Tiong Ho, Wheeling, IL (US)

(73) Assignee: Phosistor Technologies, Inc., Pleasanton, CA (US)

( * ) Notice: Subject to any disclaimer, the term of this patent is extended or adjusted under 35 U.S.C. 154(b) by 23 days.

(21) Appl. No.: 10/652,269

(22) Filed: Aug. 28, 2003

(65) Prior Publication Data

US 2005/0036738 A1 Feb. 17, 2005

Related U.S. Application Data

(60) Provisional application No. 60/406,704, filed on Aug. 28, 2002.

(51) Int. Cl.
*G02B 6/02* (2006.01)
*G02B 6/028* (2006.01)

(52) U.S. Cl. .................. 385/124; 385/129; 385/130; 385/131; 359/652; 359/653; 359/654

(58) Field of Classification Search .............. 385/33, 385/34, 124; 359/652–654
See application file for complete search history.

(56) References Cited

U.S. PATENT DOCUMENTS

| 3,994,559 | A | | 11/1976 | Crow |
| 4,152,044 | A | | 5/1979 | Liu |
| 4,466,696 | A | | 8/1984 | Carney |
| 4,639,074 | A | | 1/1987 | Murphy |
| 4,640,585 | A | * | 2/1987 | Nojiri .................. 359/652 |
| 4,712,854 | A | | 12/1987 | Mikami et al. |
| 4,839,553 | A | | 6/1989 | Mellor |
| 4,859,492 | A | * | 8/1989 | Rogers et al. .............. 427/583 |
| 4,919,504 | A | | 4/1990 | Colas et al. |
| 4,930,854 | A | | 6/1990 | Albares et al. |
| 5,046,808 | A | | 9/1991 | Chang |
| 5,155,786 | A | | 10/1992 | Ecker et al. |
| 5,217,749 | A | | 6/1993 | Denton et al. |
| 5,243,677 | A | | 9/1993 | Kanamori et al. |
| 5,259,049 | A | | 11/1993 | Bona et al. |

(Continued)

OTHER PUBLICATIONS

Boyd, J. T.; Sriram, S. "Optical Coupling From Fibers to Channel Waveguides Formed on Silicon," *Applied Optics*, 1978, 17:6, 895-898.

(Continued)

*Primary Examiner*—Frank G Font
*Assistant Examiner*—Erin D Chiem
(74) *Attorney, Agent, or Firm*—Brinks Hofer Gilson & Lione (57) ABSTRACT

An optical medium has a graded effective refractive index with a high maximum refractive index change. The medium is formed using alternating layers of two or more materials having significantly different refractive indices. The thickness of the layers of at least one of the materials is substantially less than the effective light wavelength of interest. The effective index of refraction in a local region within the medium depends on the ratio of the average volumes of the two materials in the local region. A graded index of refraction is provided by varying the relative thicknesses of the two materials.

33 Claims, 8 Drawing Sheets

U.S. PATENT DOCUMENTS

| | | | |
|---|---|---|---|
| 5,276,693 A | 1/1994 | Long et al. | |
| 5,294,288 A | 3/1994 | Melpolder et al. | |
| 5,337,398 A | 8/1994 | Benzoni et al. | |
| 5,357,593 A | 10/1994 | Bossler | |
| 5,444,805 A | 8/1995 | Mayer | |
| 5,499,309 A | 3/1996 | Kozuka et al. | |
| 5,515,464 A | 5/1996 | Sheem | |
| 5,552,092 A | 9/1996 | Francis et al. | |
| 5,675,684 A | 10/1997 | Hirataka et al. | |
| 5,689,374 A | 11/1997 | Xu et al. | |
| 5,703,895 A | 12/1997 | Ghirardi et al. | |
| 5,719,973 A | 2/1998 | Monroe et al. | |
| 5,787,214 A | 7/1998 | Harpin et al. | |
| 5,792,674 A | 8/1998 | Kitamura | |
| 5,881,190 A | 3/1999 | Harpin et al. | |
| 5,907,649 A | 5/1999 | Acklin et al. | |
| 5,930,423 A | 7/1999 | Chen et al. | |
| 5,932,397 A | 8/1999 | Mustacich | |
| 5,937,124 A | 8/1999 | Roff | |
| 6,052,397 A | 4/2000 | Jeon et al. | |
| 6,112,001 A | 8/2000 | Kishida et al. | |
| 6,118,915 A | 9/2000 | Sato | |
| 6,151,430 A | 11/2000 | Traver, Jr. et al. | |
| 6,157,765 A | 12/2000 | Bruce et al. | |
| 6,181,722 B1 | 1/2001 | Dütting et al. | |
| 6,229,947 B1* | 5/2001 | Vawter et al. | 385/132 |
| 6,240,233 B1 | 5/2001 | Weinert et al. | |
| 6,257,770 B1 | 7/2001 | Sato | |
| 6,310,995 B1 | 10/2001 | Saini et al. | |
| 6,324,323 B1 | 11/2001 | Benham et al. | |
| 6,324,326 B1 | 11/2001 | Dejneka et al. | |
| 6,330,378 B1 | 12/2001 | Forrest et al. | |
| 6,339,667 B1 | 1/2002 | Song et al. | |
| 6,345,138 B1* | 2/2002 | Kawai et al. | 385/49 |
| 6,396,984 B1 | 5/2002 | Cho et al. | |
| 6,456,761 B2 | 9/2002 | Yap et al. | |
| 6,631,225 B2 | 10/2003 | Lee et al. | |
| 6,690,871 B2 | 2/2004 | Lee et al. | |
| 6,697,551 B2 | 2/2004 | Lee et al. | |
| 6,724,968 B2 | 4/2004 | Lackritz et al. | |
| 6,775,453 B1 | 8/2004 | Hornbeck et al. | |
| 6,798,960 B2* | 9/2004 | Hamada | 385/122 |
| 6,879,757 B1 | 4/2005 | Zhou et al. | |
| 6,888,989 B1 | 5/2005 | Zhou et al. | |
| 2002/0004253 A1* | 1/2002 | Ooi et al. | 438/31 |
| 2002/0048727 A1* | 4/2002 | Zhou et al. | 430/290 |
| 2003/0007746 A1 | 1/2003 | Ryu et al. | |
| 2003/0031443 A1* | 2/2003 | Soljacic et al. | 385/125 |
| 2003/0044118 A1 | 3/2003 | Zhou et al. | |
| 2003/0053756 A1* | 3/2003 | Lam et al. | 385/49 |
| 2003/0118310 A1 | 6/2003 | Steinberg et al. | |
| 2003/0215187 A1 | 11/2003 | Tidmarsh et al. | |
| 2004/0042729 A1 | 3/2004 | Zhou et al. | |
| 2006/0062521 A1 | 3/2006 | Zhou et al. | |

OTHER PUBLICATIONS

Choi, M. H.; Koh, H. J.; Yoon, E. S.; Shin, K. C.; Song, K. C. "Self-Aligning Silicon Groove Technology Platform for the Low Cost Optical Module," *Electronic Components and Technology Conference*, 1999, 1140-1144.

Duatartas, M. F.; Fisher, J.; Luo, H.; Datta, P.; Jeantilus, A. "Hybrid Optical Packaging, Challenges and Opportunities," *2002 Electronic Components and Technology Conference*, 2002, 787-793.

Jang, S. "Automation Manufacturing Systems Technology for Optoelectronic Device Packaging," *2000 Electronic Components and Technology Conference*, 2000, 10-14.

Kurata, K. "Mass Production Techniques for Optical Modules," *1998 Electronic Components and Technology Conference*, 1998, 572-580.

Mueller, P.; Vaulk, B. "Automated Fiber Attachment for 980nm Pump Modules," *2000 Electronic Components and Technology Conference*, 2000, 5-9.

\* cited by examiner

Relationship of transmittance vs $d/\lambda_{eff}$

VARYING REFRACTIVE INDEX OPTICAL MEDIUM USING AT LEAST TWO MATERIALS WITH THICKNESSES LESS THAN A WAVELENGTH

This application claims the benefit of the filing date under 35 U.S.C. § 119(e) of Provisional U.S. Patent Application Ser. No. 60/406,704, filed on Aug. 28, 2002, which is hereby incorporated by reference in its entirety.

CROSS REFERENCES TO RELATED APPLICATIONS

This application is related to commonly assigned co pending U.S. patent application Ser. No. 10/083,674, "Integrated Planar Composite Coupling Structures for Bi directional Light Beam Transformation Between a Small Mode Size Waveguide and a Large Mode Size Waveguide," filed Oct. 22, 2001, the disclosure of which is incorporated herein by reference.

This application is also related to commonly assigned co pending U.S. patent application Ser. No. 10/651,372, "Optical Beam Transformer Module for Light Coupling between a Fiber Array and a Photonic Chip and the Method of Making the Same," filed on the same date as the present application, the disclosure of which is incorporated herein by reference.

This application is also related to commonly assigned U.S. patent application Ser. No. 09/884,691, "Method for Forming a Refractive Index Patterned Film for Use in Optical Device Manufacturing," filed Jun. 19, 2001, the disclosure of which is incorporated herein by reference.

BACKGROUND OF THE INVENTION

The present invention relates generally to structures having a refractive index distribution and in particular to an optical medium having an arbitrary desired effective refractive index distribution using at least two materials with thicknesses less than a wavelength.

Optical communication systems require optical components to guide and/or manipulate a light beam in continuous or pulse format. Of the various optical components used in optical communication systems, some have a continuous change in the distribution of the refractive index. Examples include graded refractive index multimode optical fibers [e.g., Cohen et al., "Multimode Optical Fiber," U.S. Pat. No. 3,989,350, Nov. 2, 1976; Fleming, Jr., "Multimode Optical Fiber," U.S. Pat. No. 4,033,667, Jul. 5, 1977 and graded refractive index rod lenses [e.g., Ho Shang Lee, "Miniaturization of Gradient Index Lens Used in Optical Components," U.S. Pat. No. 6,088,166, Jul. 11, 2000]. A continuous refractive index change can serve various purposes, including light beam collimation, focusing, imaging and the like [Duncan T. Moore, "Gradient Index Optics: A Review," Applied Optics, Vol. 19, No. 7, 1 Apr. 1980].

Traditionally, such graded refractive index ("GRIN") devices have been created by mixing different materials. Most of these methods involve a dominant material and another material that is either used as a dopant or dispersed in the dominant material [e.g., Park et al., "Production Method for Objects with Radially-Varying Properties," U.S. Pat. No. 6,267,915 B1, Jul. 31, 2001]. As there is generally a limit to the amount of dopant that can be uniformly distributed inside the dominant material, the maximum refractive index change ($\Delta n$) that can be achieved using such a method is generally less than 0.1. As a result, when such a method is used to make a graded refractive index lens to focus a light beam, the light focusing power of the lens is generally low. In other words, the focal length of such a lens is relatively long, and the focused beam spot size is relatively large (typically a few microns). A typical example is an ion exchanged glass based GRIN rod lens, such as lenses made by GRINTECH GmbH, for which the focal length (also called a quarter pitch) is on the order of millimeters and the focused beam spot size is on the order of a few microns.

Various techniques for producing GRIN devices having an essentially continuous refractive index change have been developed. A first method uses neutron irradiation, in which a boron rich glass is bombarded with neutrons to create a change in the concentration of boron and hence a change in the refractive index of the material [P. Sinai, Applied Optics, Vol. 10, pp 99 (1971)]. This method has limited application because the gradient is not permanent, and the maximum index change is only about 0.02.

A second method uses chemical vapor deposition (CVD) to create a fiber preform for a GRIN optical fiber. A glass material of a given refractive index is deposited on either the inside or outside of a tube. A succession of layers having slightly different chemical compositions (e.g., slightly increased or decreased dopant concentrations) is then deposited. Each layer generates a small step in the refractive index. After the preform, which typically has a diameter of about 2.5 cm, is made, a fiber is drawn from it. As the fiber is drawn, the layers become so thin that the refractive index distribution becomes effectively continuous [e.g., Cohen et al., "Multimode Optical Fiber," U.S. Pat. No. 3,989,350, Nov. 2, 1976; Fleeting, Jr., "Multimode Optical Fiber," U.S. Pat. No. 4,033,667, Jul. 5, 1977; Dabby et al., "Graded Start Rods for the Production of Optical Waveguides," U.S. Pat. No. 4,298,366, Nov. 3, 1981; Dabby et al., "Graded Optical Waveguides," U.S. Pat. No. 4,423,925, Jan. 3, 1984]. The maximum index change that can be achieved using this technique is about 0.01.

A third method involves producing a graded refractive index in organic or plastic materials. For instance, multiple plastic layers of successively increasing or decreasing refractive index can be deposited on a plastic cylinder or planar surface; the material is then cured [e.g., Toyoda et al., "Distributed Graded Index Type Optical Transmission Plastic Article and Method of Manufacturing Same, "U.S. Pat. No. 5,390,274, Feb. 14, 1995; Nakamura, "Method and Apparatus for Manufacturing Distributed Refractive Index Plastic Optical Fiber," U.S. Pat. No. 6,132,650, Oct. 17, 2000]. In related processes, monomers can be changed to polymers or cross linking of polymers can be enabled using either thermal radical polymerization (induced by UV or laser light, photodimerization, or electron ray) or condensation polymerization (induced by radical addition or photodimerization) [e.g., Jung et al., "Manufacturing Method of a Polymer GRIN Lens Using Sulfonation," U.S. Pat. No. 5,567,363, Oct. 22, 1996]. The disadvantages associated with plastics include the relatively strong absorption of light in the standard communication wavelength band, as well as the relatively low thermal and lifetime stability of the plastic material. Although attempts to address these problems —e.g., by replacing the C—H bond by a C—F bond [Sugiyama et al., "Graded Refractive Index Optical Plastic Material and Method for its Production," U.S. Pat. No. 6,166,125, Dec. 26, 2000]—have been somewhat successful, the optical communication industry still generally prefers not to use plastic gradient lenses.

A fourth method, ion exchange, is commonly used to make glass-based graded refractive index rod lenses. Ions from a molten salt, e.g., lithium bromide or potassium nitrate, diffuse into glass and are exchanged with larger ions in the glass [e.g., Senapati et al., "Graded Index Lens for Fiber Optic Applications and Technique of Fabrication," U.S. Pat. No. 6,128,926, Oct. 10, 2000; Senapati et al., "Graded Index Lens for Fiber Optic Applications and Technique of Fabrication," U.S. Pat. No. 6,172,817 B1, Jan. 9, 2001]. The possible refractive index distribution is limited by the diffusion process, and the maximum refractive index change is only about 0.05.

A fifth method is ion or molecular stuffing, in which heat is applied to separate the phases of a special glass in which one of the phases is dissolvable in an acid. After acid treatment, the glass is immersed in a bath to allow other ions or molecules to diffuse into the glass pores; alternatively, the pores may be left behind. The glass is then condensed by heating [e.g., R. K. Mohr et al., Digest of Topical Meeting on Gradient-Index Optical Imaging Systems (Optical Society of America, Washington, D.C., 1979), paper WA I; Macedo et al., "Method of Producing Optical Wave Guide Fibers," U.S. Pat. No. 3,938,974, Feb. 17, 1976. However, most glasses that are well accepted for optical communication do not possess the required uniform phase separation property. In addition, the maximum refractive index change is still only about 0.05.

A sixth method involves a "sol-gel" technique, in which a solution of multiple metal oxides is spin coated or dip coated on a surface. Heat treatment follows to evaporate the solvent and condense the metal oxides, thereby forming a thin layer of glass film. To create a graded refractive index multiple layers having different metal oxide content can be successively deposited. One problem with this technique is that cracking of the film tends to occur as the film grows thicker and the amount of dopant in the solution increases. It is thus difficult to produce a film thickness of the order of about 10 µm. In an alternative process, a gel glass film or gel glass rod can be made first, and glass phase separation can be induced by heat treatment followed by selective leaching or etching to create a microporous structure with a graded refractive index [e.g., McCollister et al., "Process of Making Glass Articles Having Antireflective Coatings and Product," U.S. Pat. No. 4,273,826, Jun. 16, 1981; S. P. Mukherjee et al., "Gradient index AR Film Deposited by the Sol Gel Process," Applied Optics, Vol. 21, No. 2, p. 283, Jan. 15, 1982; S. Konishi et al., "r-GRIN Glass Rods Prepared By a Sol Gel Method," Journal of Non Crystalline Solids, Vol. 100, pp. 511 513 (1988); Debsikdar, "Broadband Antireflective Coating Composition and Method," U.S. Pat. No. 4,839,879, May 16, 1989]. Again these methods can only produce a maximum index change of about 0.1.

A seventh method involves UV imprinting of photosensitive glasses to disrupt the metal oxygen bond, thereby inducing a refractive index change. This technique is commonly used to make fiber Bragg gratings (FBG), which are common components in today's fiber-optic communication systems. The most commonly used material is germanium doped silica fiber. After hydrogen loading and UV laser imprinting, the maximum index change is about 0.1. Another glass of higher photosensitivity is lead oxide, but it has been found that the maximum achievable index change for UV imprinting of lead oxide is only about 0.2 [see the above-referenced co-pending U.S. patent application Ser. No. 09/884,691.

An eighth method makes use of centrifugal force applied during the combustion synthesis of composite materials, with the result that the composition and particle size of the metallic or ceramic component changes continuously across the thickness of the product [e.g., Munir et al., "Centrifugal Synthesis and Processing of Functionally Graded Materials," U.S. Pat. No. 6,136,452, Oct. 24, 2003. This method involves applying a glass melting high temperature to a rotating mold containing glass powder, mixtures. As in the glass melting methods involving dopants, there is a maximum concentration of the metallic or ceramic component that can be achieved without clustering. Consequently, the maximum index change that can be achieved is small (about 0.1).

None of these methods is able to produce a maximum index change greater than about 0.2. In addition, none of these methods is able to produce an arbitrary refractive index profile with high precision because these methods generally rely in some way on diffusion of one material into another, which cannot be precisely controlled. In some applications, for instance, light coupling between a single mode optical fiber and a III-V compound semiconductor waveguide, a graded refractive index device with a maximum refractive index change greater than about 0.2 would be desirable. Such a device would provide higher focusing power and a smaller focused spot size than GRIN devices produced by existing techniques.

BRIEF SUMMARY OF THE INVENTION

Embodiments of the present invention provide a device having a graded (or distributed or gradient) effective refractive index profile with a very high maximum refractive index change. According to one aspect of the present invention a light transmitting device with a graded index of refraction includes alternating layers of two (or more) materials having significantly different refractive indices (e.g., a difference of at least 0.2). The thickness of the layers of at least one of the materials is substantially less than the effective light wavelength of interest. The effective index of refraction in a local region within the device depends on the ratio of the average volumes of the two materials in the local region; because the relative thicknesses of the layers can be made different for different layers, a graded index of refraction can be provided. Control of the layer thicknesses also allows an arbitrary refractive index profile to be provided.

According to another aspect of the present invention, a light transmitting device having a graded index of refraction includes a body made substantially of a first material, such as an amorphous material. Embedded in the body area number of discrete structures comprising a second material (e.g., another amorphous material), each of the discrete structures having a size in at least one dimension substantially smaller than an effective wavelength of light in the second material. The first material has a first index of refraction and the second material has a second index of refraction different from the first index of refraction; in one embodiment, the first and second indices differ by at least 0.5. The size of the discrete structures in the at least one dimension is different in a first local region of the body than in a second local region of the body, thereby providing a graded index of refraction. In one embodiment, the discrete structures include substantially planar (or curved) layers having a size in one dimension that is substantially smaller than an effective wavelength of light in the second material. In another embodiment, the discrete structures include filamentary structures having a size in two dimensions that is substantially smaller than an effective wavelength of light in the second material. In yet another embodiment, the discrete structures include grains having a size in three dimensions that is substantially smaller than an effective wavelength of light in the second material.

According to another aspect of the present invention, a light transmitting device having a graded index of refraction includes a plurality of alternating layers of a first material and a second material, each layer of the second material having a thickness substantially less than an effective wavelength of light in the second material. The first material has a first index of refraction, and the second material has a second index of refraction different from the first index of refraction; in one embodiment, the first and second indices differ by at least 0.5. The plurality of alternating layers forms a light-transmitting medium with an effective index of refraction in a local region that depends on a local ratio of a volume of the layers of the first material to a volume of the layers of the second material. A graded effective index of refraction along a direction transverse to the layers is formed by varying the thicknesses of the layers. The thickness of each layer of the first material can also be made to be substantially less than the effective wavelength of light in the second material. Amorphous materials, such as silicon dioxide and titanium dioxide, can be used as the first and second materials. Polycrystalline materials can also be used. The layers may be planar or curved to provide light beam focusing in two dimensions. A variety of refractive index distributions, including parabolic distributions, can be provided. The distribution can also be optimized to provide mode matching between other light-transmitting devices (e.g., between a single mode optical fiber and a III-V semiconductor waveguide).

According to another aspect of the present invention, a light transmitting device having a graded index of refraction includes a plurality of alternating layers of a first amorphous material having a thickness and a second amorphous material, each layer of the second material having a thickness substantially less than an effective wavelength of light in the second material. The first material has a first index of refraction, and the second material has a second index of refraction different from the first index of refraction. The plurality of alternating layers forms a light-transmitting medium with an effective index of refraction in a local region that depends on a local ratio of a volume of the layers of the first material to a volume of the layers of the second material. A graded effective index of refraction along a direction transverse to the layers is formed by varying the thicknesses of the layers. The refractive index profile can be controlled so as to provide a desired focused optical spot size and mode (wavefront) profile for transmitted light.

According to another aspect of the present invention, an optical module includes a substrate assembly that has a photonic chip mounting region and a groove extending toward the photonic chip mounting region. The optical module also includes an optical coupler having a graded index of refraction disposed between the groove and the photonic chip mounting region. The optical coupler includes a plurality of alternating layers of a first amorphous material and a second amorphous material, each layer of the second material having a thickness substantially less than an effective wavelength of light in the second material. The first material has a first index of refraction, and the second material has a second index of refraction different from the first index of refraction. The plurality of alternating layers forms a light transmitting medium with an effective index of refraction in a local region that depends on a local ratio of a volume of the layers of the first amorphous material to a volume of the layers of the second amorphous material. A graded effective index of refraction along a direction transverse to the layers is formed by varying the thicknesses of the layers. A photonic chip can be mounted in the photonic chip mounting region, and an optical fiber can be mounted in the groove.

The following detailed description together with the accompanying drawings will provide a better understanding of the nature and advantages of the present invention.

DETAILED DESCRIPTION OF THE INVENTION

As is generally known, light is an electromagnetic wave oscillating at high frequency. All portions of the electromagnetic spectrum are meant to be included, including but not limited to, radiowaves, microwaves, millimeter waves, infrared radiation, visible light, and ultraviolet radiation. When light travels through a dielectric medium (e.g., glass), its speed (v) is reduced relative to the speed of light in vacuum (c). The refractive index (n) of the medium is defined as n=c/v. The frequency of the light is unchanged, and the wavelength is reduced from $\lambda_o$ in vacuum to $\lambda_{\it{eff}}=\lambda_o/n$ in the medium.

Figure 1:
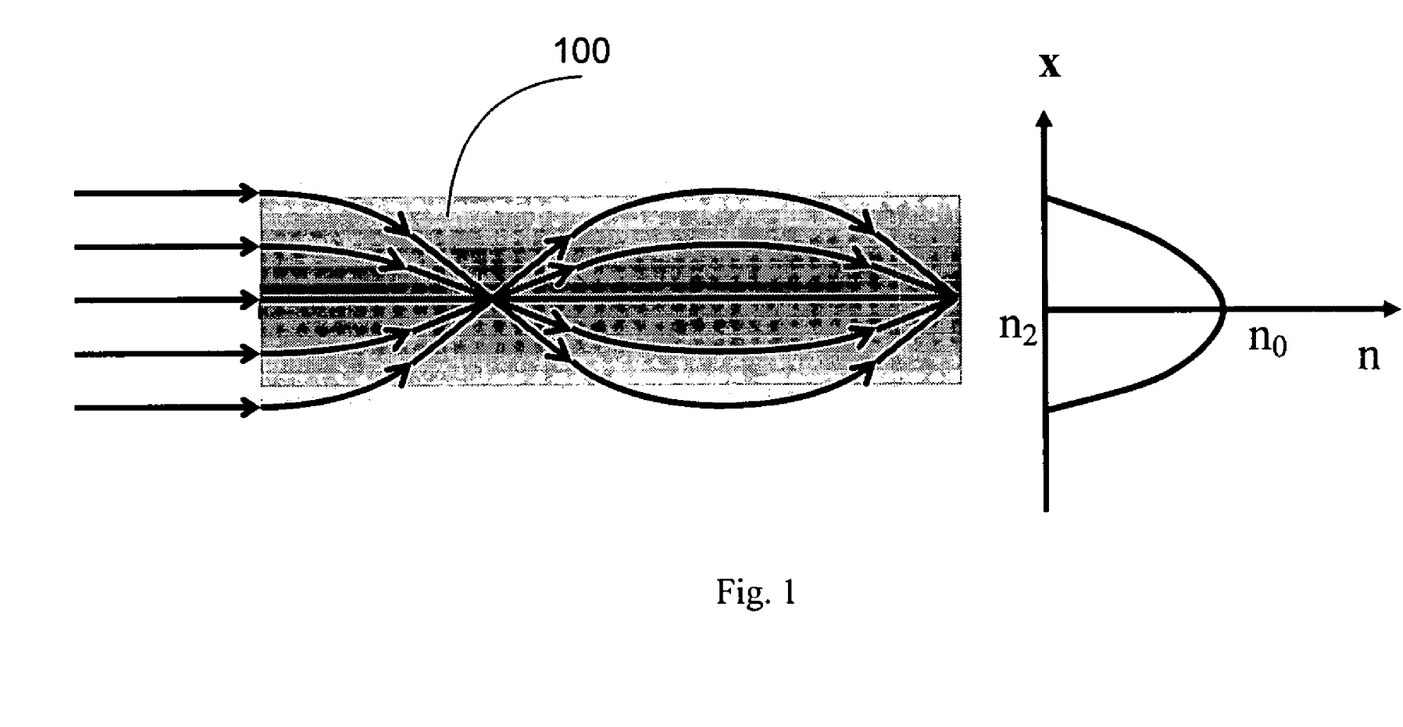
FIG. 1 is a schematic diagram of light propagation in a medium with a parabolic refractive index distribution.

As shown in FIG. 1, in a graded refractive index ("GRIN") optical medium 100, the material has a refractive index n(r) that decreases substantially continuously from a value of no at the central axis (r=0) to a value of $n_b$ at the outside border (r=a). In this example, n(r) has a parabolic refractive index distribution given by the formula:

$$n(r) = n_o\left[1 - \Delta\left(\frac{r}{a}\right)^2\right], \text{ where } \Delta = \frac{n_0 - n_b}{n_0}.$$

This index distribution will cause light rays 110 propagating longitudinally through medium 100 to bend towards the central axis and to be periodically refocused. If the optical medium is cut to the right length (f), the medium can function as a lens to focus or expand and collimate a beam of light. The focal length (or quarter pitch) of such a GRIN lens is given approximately by $$f = \frac{a\pi}{2\sqrt{2\Delta}}.$$

In general, the focused spot size for any light beam or pulse is finite. The shorter the focal length of the lens, the smaller the focused spot size. Accordingly, a smaller focused spot size can be achieved by increasing $\Delta$ (which is dominated by the index change between the central axis and the outside border), by decreasing $\alpha$ (the distance between the central axis and the outside border), or both. At the same time, there is a physical diffraction limit; consequently, the smallest focused spot size of any wave will only be about the size of the wavelength in the medium where focusing occurs. In the case of a GRIN lens, the focused light beam is located near the central axis, where the refractive index is the highest. Hence, if a high refractive index material is used at the central axis, a much smaller diffraction limited beam spot size can be achieved because the wavelength of light in a material is equal to the vacuum wavelength divided by the refractive index of the material. If the focused light beam is coupled into another mode matched waveguide, a highly efficient light coupling between the GRIN lens and the waveguide can be achieved, as will be described further below.

In principle, a graded refractive index distribution can be constructed from multiple thin layers of optical media with different refractive indices. If the layer thickness is small enough, there is a negligible difference in the focusing effect between a continuously graded refractive index distribution and a step graded refractive index distribution provided by multiple thin layers of materials with different refractive indices. Accordingly, a parabolic refractive index distribution can be produced by depositing multiple thin layers of different materials selected so that the refractive index decreases with distance from the central axis.

Embodiments of the present invention employ two (or more) materials having a relatively large refractive index difference to create a structure having a graded refractive index (e.g., a parabolic distribution). By using a high refractive index material such as silicon (n=3.4), the refractive index at the central axis of the parabolic GRIN structure can be made quite high, and hence the spot size of the focused light beam can be quite small (e.g., less than 0.5 μm for light having a wavelength of 1.5 μm in air).

Figure 2:
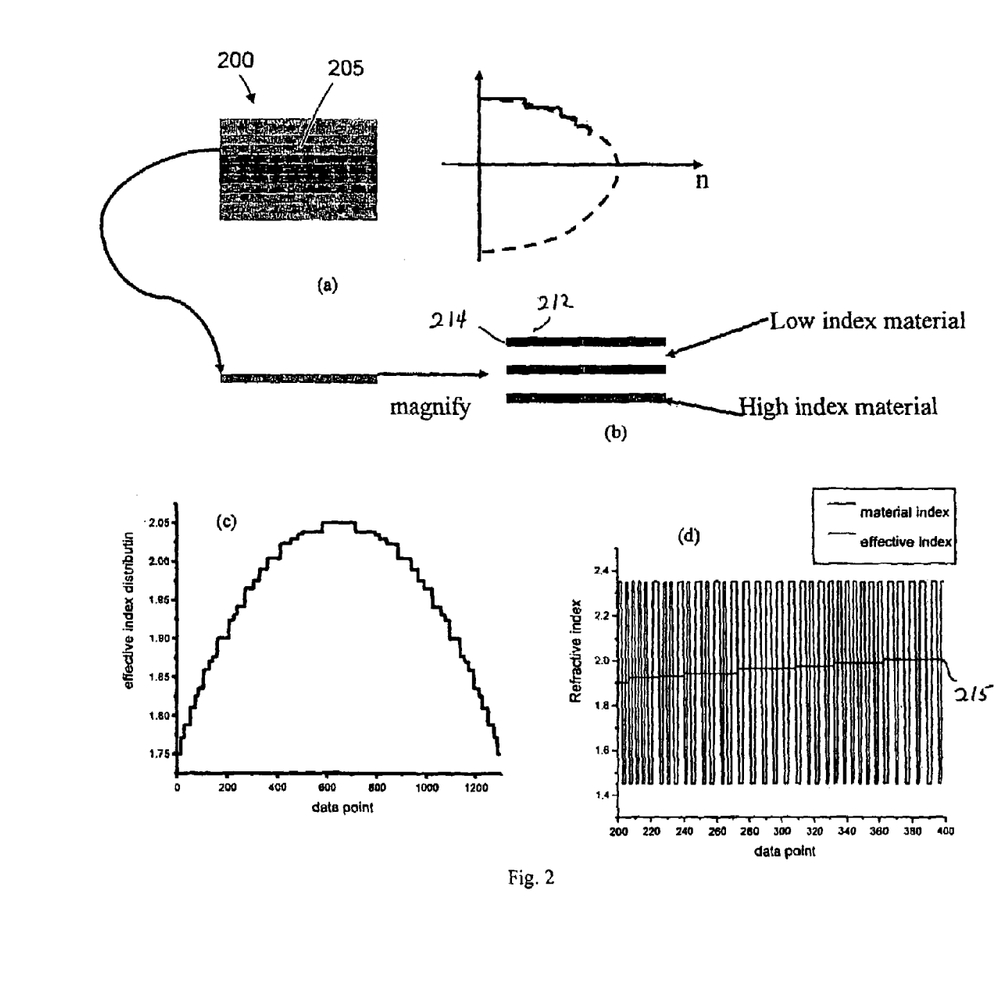
FIGS. 2A-B are schematic diagrams representing the use of two materials to realize a parabolic effective refractive index distribution according to the present invention.
FIGS. 2C-D are graphs of the effective index distribution as a function of position for the structure in FIGS. 2A-B.

When an optical medium with a dimension that is substantially smaller than the effective wavelength of light is embedded in another optical medium of a different refractive index, the result is an effective refractive index with a value between those of the two optical media. FIG. 2 illustrates the principle. A medium 200 provides an approximately continuous parabolic refractive index distribution by using multiple layers 205 of materials having different refractive index as shown in FIG. 2A. Each layer 205 is constructed from a number of thin layers 212, 214 of two materials of different refractive indices, as shown in FIG. 2B. Each material's optical thickness is substantially less than the effective wavelength of light in the material. The effective refractive index 215, illustrated in FIGS. 2C-D, is approximately $$n_{\text{eff}} = \frac{n_1 L_1 + n_2 L_2}{L_1 + L_2},$$

where $n_1$ and $n_2$ are the refractive indexes of the two materials respectively, and $L_1$ and $L_2$, are the total thickness of the respective materials within a local region larger than the effective wavelength of the light. This can be generalized to a medium with a mixture of two particles with different refractive indices, in which $$n_{\text{eff}} = \frac{n_2 \left[\frac{V_1}{V_2} \frac{n_1}{n_2} + 1\right]}{\left[\frac{V_1}{V_2} + 1\right]},$$

in which $V_1$ and $V_2$ are the volumes of the first and second materials. Other layers in medium 200 are made of the same materials, but with different thicknesses $L_1$ and $L_2$, thereby providing different $n_{\text{eff}}$.

There are concerns about the effectiveness of using two materials to achieve the effect of a real continuous refractive index distribution. One concern is the light transmission efficiency through the many optical interfaces of the structure. A second concern is how effectively this structure focuses light. A third concern is the total amount of light that will be lost when light is focused using this structure. These concerns will now be addressed.

Figure 3:
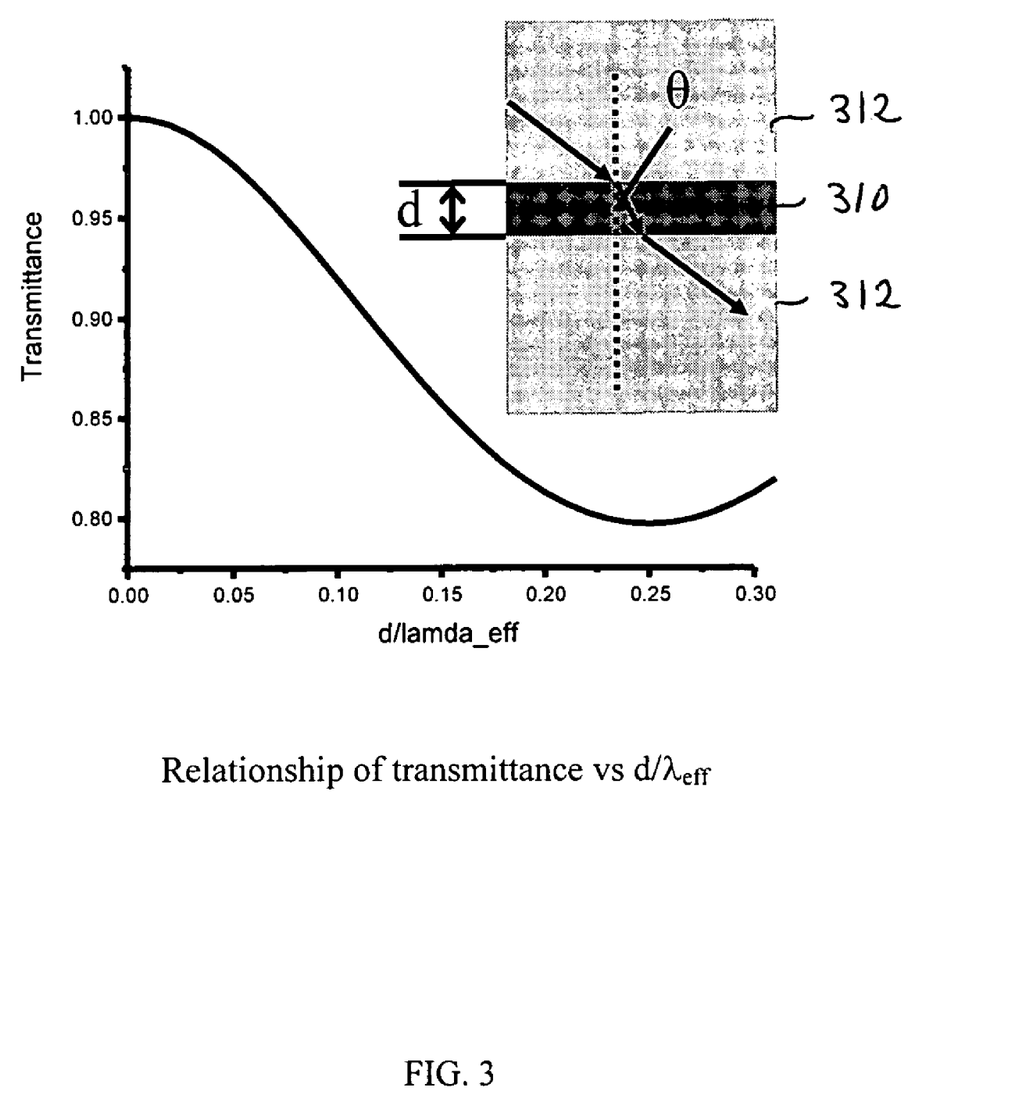
FIG. 3 is a graph of transmittance as a function of the normalized thickness of a thin layer of one optical medium sandwiched in another optical medium.

High light transmission efficiency can be provided by using sufficiently thin layers of the two materials. As is generally known in the art and illustrated in FIG. 3, when a light beam shines through a thin film 310 of thickness d, having a refractive index $n_2$, sandwiched in another optical medium 312, the light transmittance (defined as the amount of light energy transmitted through the film divided by the amount of light energy incident onto the film) is given by $$T(d) = \frac{I_{\text{trans}}}{I_{\text{inc}}} = \frac{(1-R)^2}{(1-R)^2 + 4R\sin^2(k_\perp d)}, \text{ where } k_\perp = \frac{2\pi}{\lambda_{\text{eff}}} = \frac{2\pi n_2}{\lambda}\cos\theta,$$

with $\lambda$ being the wavelength of light in vacuum, $\theta$ being the angle of refraction in the thin film 310, and R being the reflectance of the thin film. FIG. 3 shows the transmittance of light as a function of $d/\lambda_{\text{eff}}$ for a light beam traveling from silica (SiO$_2$, $n_1$=1.45) through a very thin film (thickness d) of titania (TiO$_2$, $n_1$=2.35) into silica again. It can be seen that when $d/\lambda_{\text{eff}}$ is less than 0.1, more than 90% of the light will be transmitted. Hence, a general guideline is that when the thickness of the thin film is less than about $$\frac{\lambda}{10 n_2 \cos\theta},$$

more than 90% of the light will pass through the film. If the light beam shines onto the film at normal incidence (i.e. $\theta=0°$), the single layer film thickness is advantageously chosen to be less than $$\frac{\lambda}{10 n_2},$$

which is about 66 nm for TiO$_2$ and about 100 nm for SiO$_2$. In GRIN-lens focusing applications, the light wave travels paraxially along the central axis, so that the angle θ varies from 90° to about 60°. Accordingly, the fraction of light transmitted is generally more than 95% if single layer thicknesses less than $$\frac{\lambda}{10n_2}$$

are used.

Figure 4A:
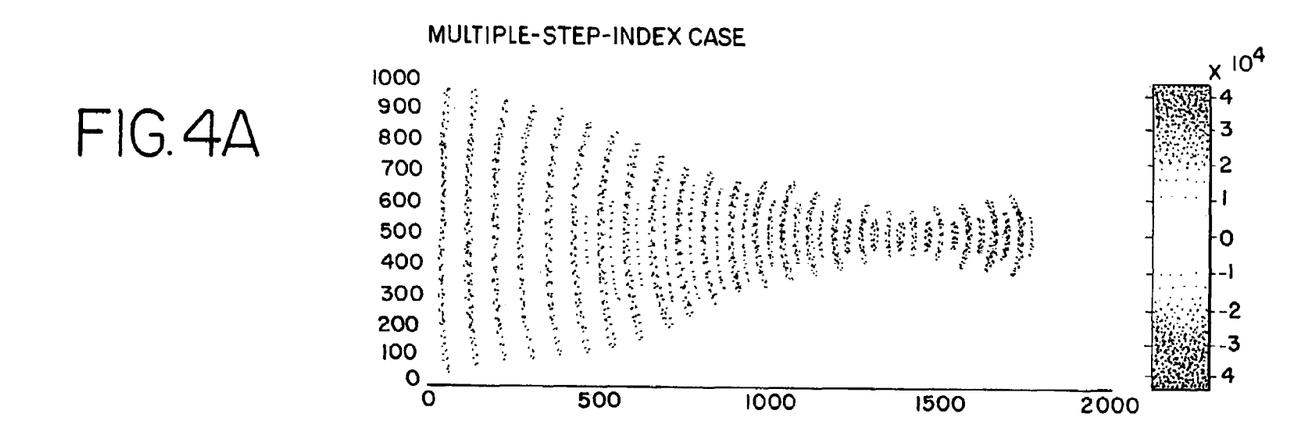
FIGS. 4A-B are graphs of a computer simulation of light propagation through a parabolic refractive index distribution realized with multiple materials and with two materials, respectively.
Figure 4B:
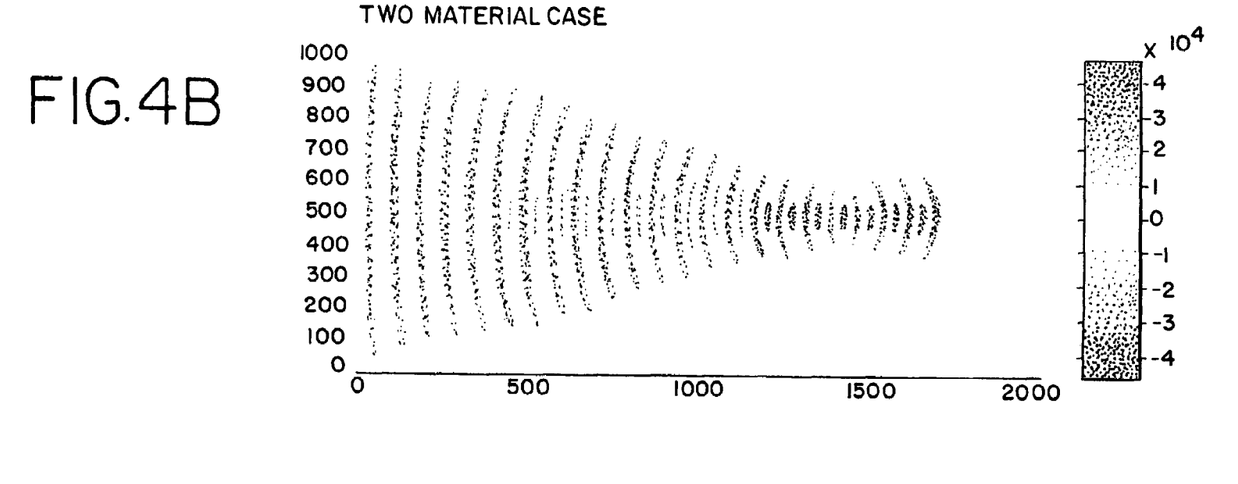

To evaluate the focusing power of the GRIN device, light wave propagation was simulated for a first GRIN lens having a parabolic refractive index distribution made up of thin layers of numerous different materials, substantially approximating a continuous index distribution, and for a second GRIN lens made up of layers of only two materials. FIGS. 4A-B show the simulation result for a parabolic refractive index distribution of $$n(r) = n_0\left[1 - \Delta\left(\frac{r}{a}\right)^2\right],$$

with a=5 μm, $n_0$=1.75 and $n_b$=1.45. FIG. 4A shows results for the a substantially continuous GRIN lens, and FIG. 4B shows results for the two material GRIN lens. As can be seen, both GRIN tenses have similar focal lengths and focused spot sizes.

Figure 5A:
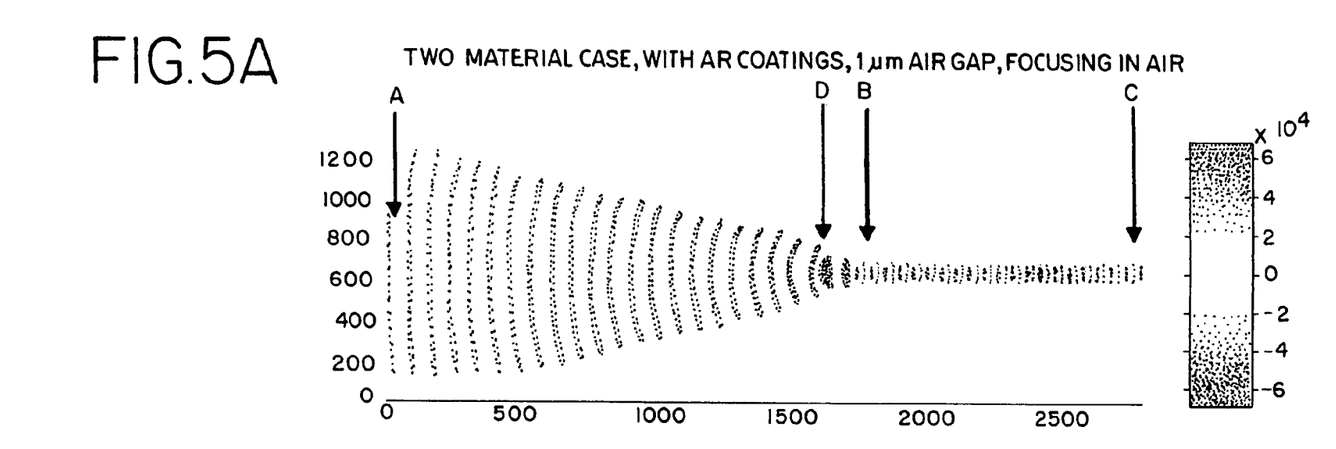
FIGS. 5A-B are graphs of simulated light coupling from a GRIN lens into a mode matched waveguide for a parabolic refractive index distribution realized with two materials and with multiple materials, respectively.
Figure 5B:
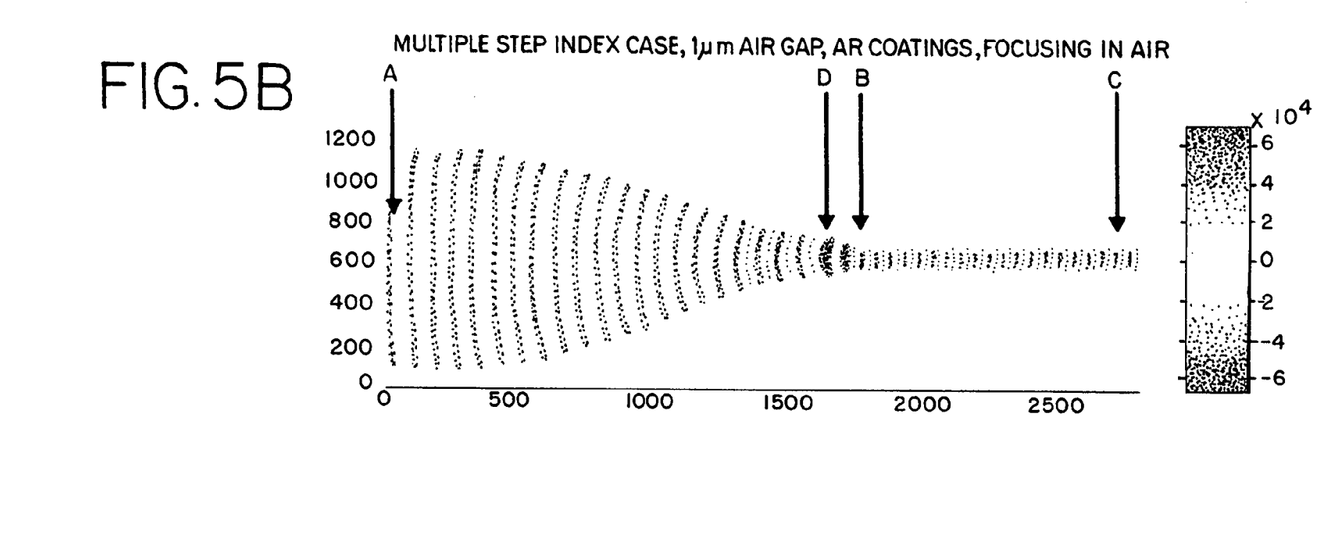

To evaluate the energy loss for light propagating longitudinally through the device, the optical energy flow was calculated based on integration over space of the standard electromagnetic energy flow vector $\vec{S} = \vec{E} \times \vec{H}$, where $\vec{E} \times \vec{H}$ are the electric and magnetic fields. FIGS. 5A-B show simulation results for a two material GRIN lens and a many material GRIN lens, respectively. In both simulations, it has been assumed that there is no material absorption of light and all the interfaces are perfect. Each GRIN lens extends from point A to point D, so that the focal point is just outside the GRIN lens. A semiconductor waveguide made of Indium phosphide (InP), with its mode matched to the focused beam profile, extends from point B to point C, leaving an air gap of 1 μm between the GRIN lens and the semiconductor waveguide. Antireflection coatings have been included on both the GRIN lens end face and on the InP waveguide end face. Table 1 shows light energy transmission efficiency for each GRIN lens. The two material case is not significantly different from the substantially continuous case.

TABLE 1

| | Two-material case | Substantially Continuous case |
|---|---|---|
| Fraction of light energy passed through the GRIN lens from A to B | 99.9% | 98.8% |
| Fraction of light energy passed from B to C (including mode matching) | 99.7% | 99.5% |
| Fraction of light energy within the InP waveguide at C (i.e., within 3× width of the waveguide) | 95.6% | 98.2% |
| Overall coupling efficiency | 95.3% | 97.7% |

The foregoing analyses indicate that a GRIN device made up of alternating layers of two different materials can provide high transmission efficiency, a short focal length, a small focused spot size, and acceptably low energy loss when coupling to a small mode size waveguide or other optical components.

Fabrication of such a structure is straightforward; existing technologies for fabricating thin film dense wavelength division multiplexing (DWDM) filters for optical communications by depositing successive layers of materials can be adapted to fabricating GRIN devices. Deposition methods that may be employed to create the structure include sputtering, chemical vapor deposition, electron beam and thermal evaporation, ion beam deposition or dual ion beam deposition (also called ion assisted deposition, or IAD), sol gel spin or dip coating and others.

One embodiment of the present invention consists of a large number (e.g., 306) of alternating thin layers of silica ($SiO_2$) and titania ($TiO_2$) on a flat silicon substrate. The thickness of each layer (in nm) for this embodiment is listed in Table 2. A thicker buffer layer of $SiO_2$ (1 μm) is deposited first in order to separate the GRIN device from the substrate material so that light will not leak into the substrate. Aside from the buffer layer, the thicknesses of the silica layers range from 20 nm to 70 nm, and the thicknesses of the titania layers range from 20 nm to 80 nm. In regions where the effective index of refraction is high, titanic layers are near their thickest while silica layers are near their thinnest; in regions where the effective index is low, the reverse applies.

Figure 6:
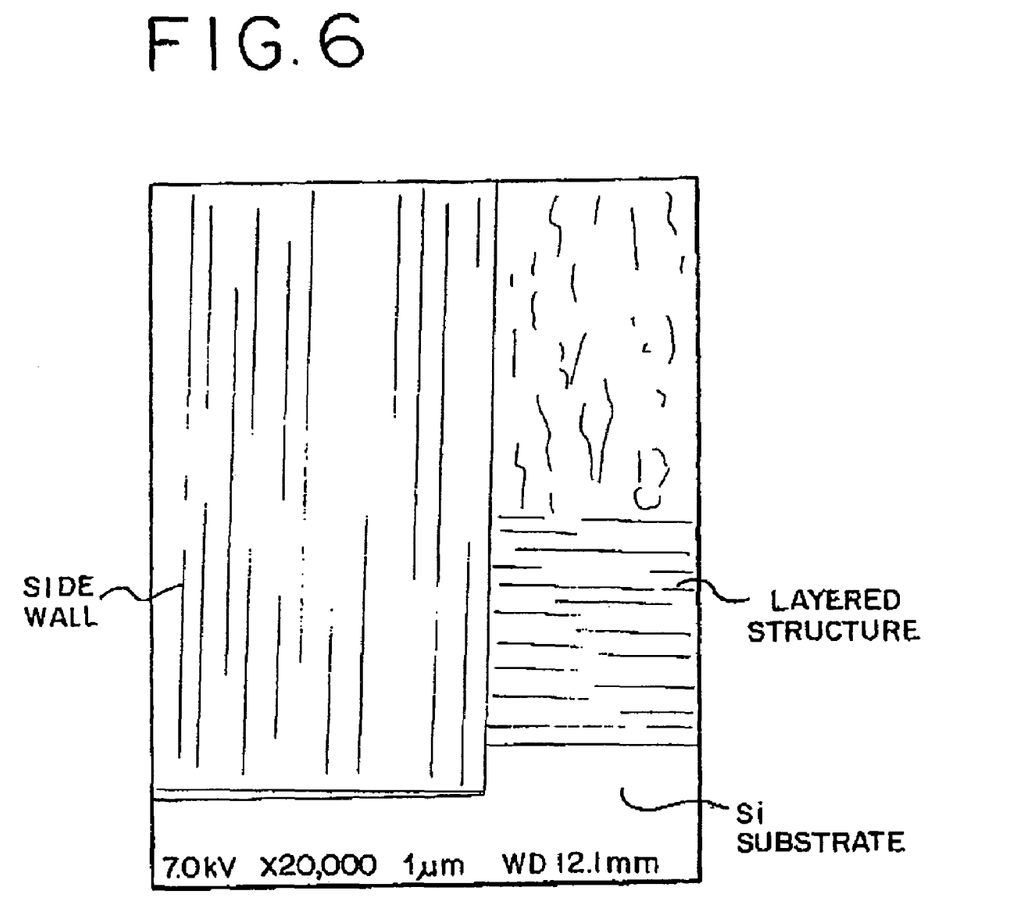
FIG. 6 is a scanning electron microscope (SEM) image of a GRIN structure realized by depositing alternating thin layers of two materials of different layer thickness on a flat silicon substrate.
Figure 7A:
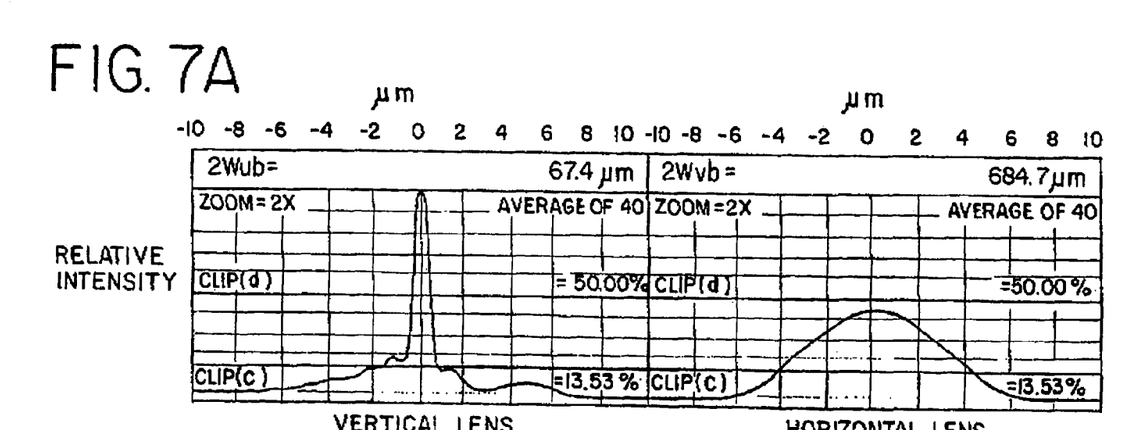
FIGS. 7A-B are graphs showing the measured focused spot profile and input spot profile for a one dimensional GRIN lens realized using $SiO_2$ and $TiO_2$.
Figure 7B:
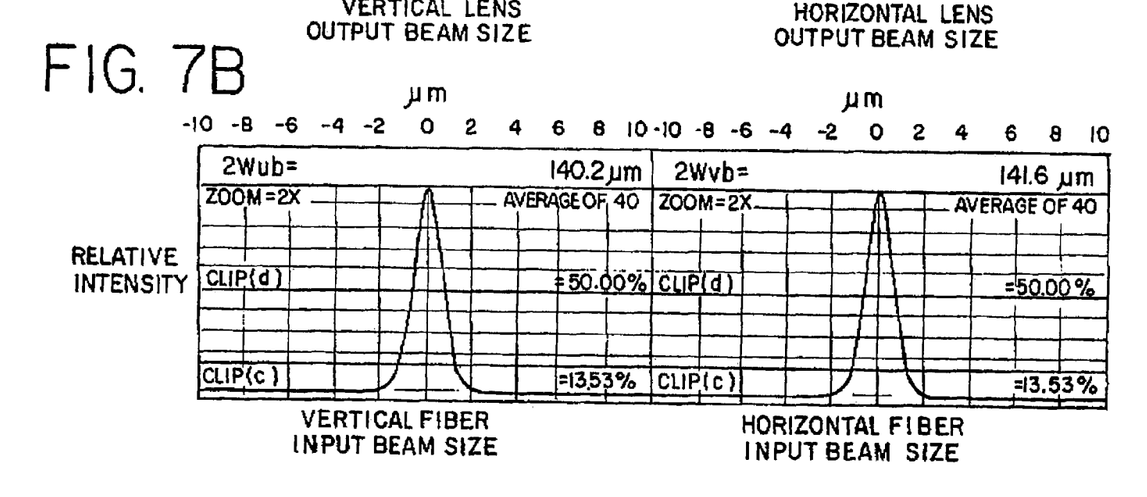

FIG. 6 shows an scanning electron microscope (SEM) image of such a structure deposited on a flat Si substrate, and FIG. 7A shows the measurement result of such a structure acting as a one dimensional GRIN lens to focus a light beam from a standard single mode fiber into an elliptical beam; as a comparison the output beam profile from a standard single mode fiber is shown in FIG. 7B.

It should be noted that a planar layered structure would focus light only in the direction transverse to the plane of the layers (the vertical direction for horizontal layers on a substrate). In the lateral or horizontal direction, light beam size transformation can be achieved using tapered waveguide structures, e.g., as described in the above referenced copending U.S. patent application Ser. No. 10/083,674.

TABLE 2

| Mtl | nm |
|---|---|
| TiO2 | 60 |
| SiO2 | 20 |
| TiO2 | 50 |
| SiO2 | 20 |
| TiO2 | 60 |
| SiO2 | 20 |
| TiO2 | 50 |
| SiO2 | 20 |
| TiO2 | 60 |
| SiO2 | 20 |
| TiO2 | 50 |
| SiO2 | 20 |
| TiO2 | 60 |
| SiO2 | 20 |
| TiO2 | 50 |
| SiO2 | 20 |
| TiO2 | 80 |
| SiO2 | 30 |
| TiO2 | 80 |
| SiO2 | 30 |
| TiO2 | 80 |
| SiO2 | 30 |
| TiO2 | 80 |
| SiO2 | 30 |
| TiO2 | 80 |
| SiO2 | 30 |
| TiO2 | 80 |

TABLE 2-continued

| Mtl | nm |
|---|---|
| SiO2 | 30 |
| TiO2 | 80 |
| SiO2 | 30 |
| TiO2 | 80 |
| SiO2 | 30 |
| TiO2 | 50 |
| SiO2 | 20 |
| TiO2 | 80 |
| SiO2 | 30 |
| TiO2 | 50 |
| SiO2 | 20 |
| TiO2 | 50 |
| SiO2 | 20 |
| TiO2 | 50 |
| SiO2 | 20 |
| TiO2 | 50 |
| SiO2 | 20 |
| TiO2 | 50 |
| SiO2 | 20 |
| TiO2 | 50 |
| SiO2 | 20 |
| TiO2 | 50 |
| SiO2 | 20 |
| TiO2 | 50 |
| SiO2 | 20 |
| TiO2 | 70 |
| SiO2 | 30 |
| TiO2 | 80 |
| SiO2 | 20 |
| TiO2 | 70 |
| SiO2 | 30 |
| TiO2 | 70 |
| SiO2 | 30 |
| TiO2 | 70 |
| SiO2 | 30 |
| TiO2 | 80 |
| SiO2 | 20 |
| TiO2 | 40 |
| SiO2 | 20 |
| TiO2 | 80 |
| SiO2 | 20 |
| TiO2 | 40 |
| SiO2 | 20 |
| TiO2 | 70 |
| SiO2 | 30 |
| TiO2 | 40 |
| SiO2 | 20 |
| TiO2 | 70 |
| SiO2 | 30 |
| TiO2 | 40 |
| SiO2 | 20 |
| TiO2 | 70 |
| SiO2 | 30 |
| TiO2 | 40 |
| SiO2 | 20 |
| TiO2 | 40 |
| SiO2 | 20 |
| TiO2 | 40 |
| SiO2 | 20 |
| TiO2 | 40 |
| SiO2 | 20 |
| TiO2 | 40 |
| SiO2 | 20 |
| TiO2 | 40 |
| SiO2 | 20 |
| TiO2 | 40 |
| SiO2 | 20 |
| TiO2 | 40 |
| SiO2 | 20 |

TABLE 2-continued

| Mtl | nm |
|---|---|
| TiO2 | 80 |
| SiO2 | 30 |
| TiO2 | 40 |
| SiO2 | 20 |
| TiO2 | 50 |
| SiO2 | 30 |
| TiO2 | 40 |
| SiO2 | 20 |
| TiO2 | 80 |
| SiO2 | 30 |
| TiO2 | 40 |
| SiO2 | 20 |
| TiO2 | 30 |
| SiO2 | 20 |
| TiO2 | 40 |
| SiO2 | 20 |
| TiO2 | 30 |
| SiO2 | 20 |
| TiO2 | 40 |
| SiO2 | 20 |
| TiO2 | 40 |
| SiO2 | 30 |
| TiO2 | 40 |
| SiO2 | 20 |
| TiO2 | 40 |
| SiO2 | 20 |
| TiO2 | 40 |
| SiO2 | 30 |
| TiO2 | 40 |
| SiO2 | 20 |
| TiO2 | 40 |
| SiO2 | 30 |
| TiO2 | 30 |
| SiO2 | 20 |
| TiO2 | 30 |
| SiO2 | 20 |
| TiO2 | 30 |
| SiO2 | 20 |
| TiO2 | 30 |
| SiO2 | 20 |
| TiO2 | 30 |
| SiO2 | 20 |
| TiO2 | 30 |
| SiO2 | 20 |
| TiO2 | 30 |
| SiO2 | 20 |
| TiO2 | 40 |
| SiO2 | 30 |
| TiO2 | 40 |
| SiO2 | 30 |
| TiO2 | 40 |
| SiO2 | 30 |
| TiO2 | 40 |
| SiO2 | 30 |
| TiO2 | 40 |
| SiO2 | 30 |
| TiO2 | 40 |
| SiO2 | 30 |
| TiO2 | 20 |
| SiO2 | 20 |
| TiO2 | 40 |
| SiO2 | 30 |
| TiO2 | 20 |
| SiO2 | 20 |
| TiO2 | 40 |
| SiO2 | 30 |
| TiO2 | 20 |
| SiO2 | 20 |
| TiO2 | 20 |

TABLE 2-continued

| Mtl | nm |
|---|---|
| SiO2 | 20 |
| TiO2 | 40 |
| SiO2 | 30 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 20 |
| TiO2 | 20 |
| SiO2 | 40 |
| TiO2 | 30 |
| SiO2 | 20 |
| TiO2 | 20 |
| SiO2 | 20 |
| TiO2 | 20 |
| SiO2 | 40 |
| TiO2 | 30 |
| SiO2 | 20 |
| TiO2 | 20 |
| SiO2 | 20 |
| TiO2 | 20 |
| SiO2 | 40 |
| TiO2 | 30 |
| SiO2 | 20 |
| TiO2 | 30 |
| SiO2 | 40 |
| TiO2 | 30 |
| SiO2 | 40 |
| TiO2 | 30 |
| SiO2 | 40 |
| TiO2 | 30 |
| SiO2 | 40 |
| TiO2 | 30 |
| SiO2 | 40 |
| TiO2 | 30 |
| SiO2 | 40 |
| TiO2 | 20 |
| SiO2 | 30 |
| TiO2 | 20 |
| SiO2 | 30 |
| TiO2 | 20 |
| SiO2 | 30 |
| TiO2 | 20 |
| SiO2 | 30 |
| TiO2 | 20 |
| SiO2 | 30 |
| TiO2 | 20 |
| SiO2 | 30 |
| TiO2 | 30 |
| SiO2 | 50 |
| TiO2 | 20 |
| SiO2 | 40 |
| TiO2 | 30 |
| SiO2 | 50 |
| TiO2 | 20 |
| SiO2 | 40 |
| TiO2 | 30 |
| SiO2 | 50 |
| TiO2 | 20 |
| SiO2 | 40 |
| TiO2 | 30 |
| SiO2 | 50 |
| TiO2 | 20 |
| SiO2 | 40 |
| TiO2 | 20 |
| SiO2 | 40 |
| TiO2 | 20 |
| SiO2 | 40 |
| TiO2 | 20 |
| SiO2 | 40 |
| TiO2 | 20 |
| SiO2 | 40 |
| TiO2 | 20 |
| SiO2 | 50 |
| TiO2 | 20 |
| SiO2 | 50 |
| TiO2 | 20 |
| SiO2 | 50 |
| TiO2 | 20 |
| SiO2 | 50 |
| TiO2 | 20 |
| SiO2 | 50 |
| TiO2 | 20 |
| SiO2 | 60 |
| TiO2 | 20 |
| SiO2 | 60 |
| TiO2 | 20 |
| SiO2 | 60 |
| TiO2 | 20 |
| SiO2 | 70 |
| TiO2 | 20 |
| SiO2 | 70 |
| TiO2 | 20 |
| SiO2 | 70 |
| TiO2 | 20 |
| SiO2 | 20 |
| SiO2 | 1000 |

Figure 8A:
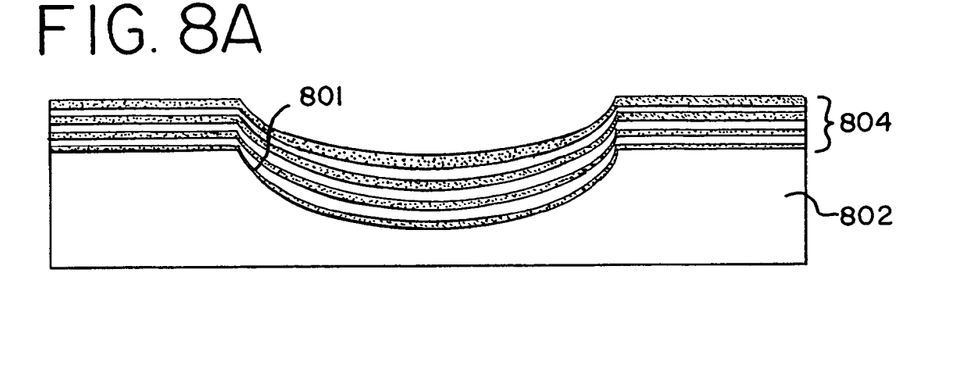
FIGS. 8A-D are schematic diagrams illustrating process steps for fabricating a GRIN device from curved layers of two materials.
Figure 8B:
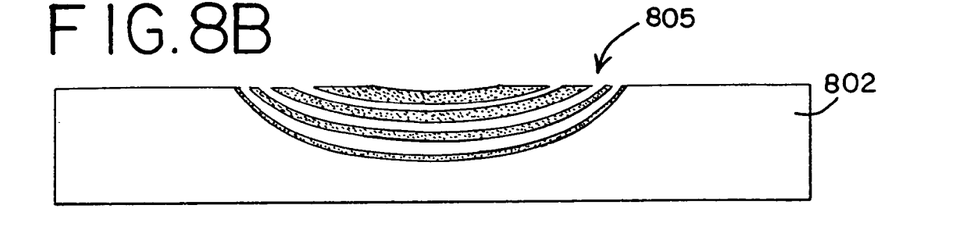
Figure 8C:
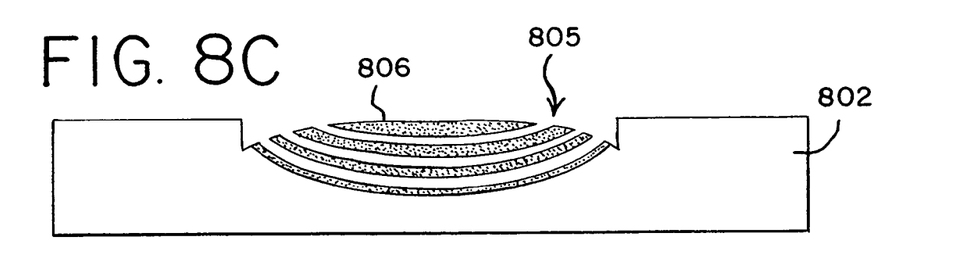
Figure 8D:
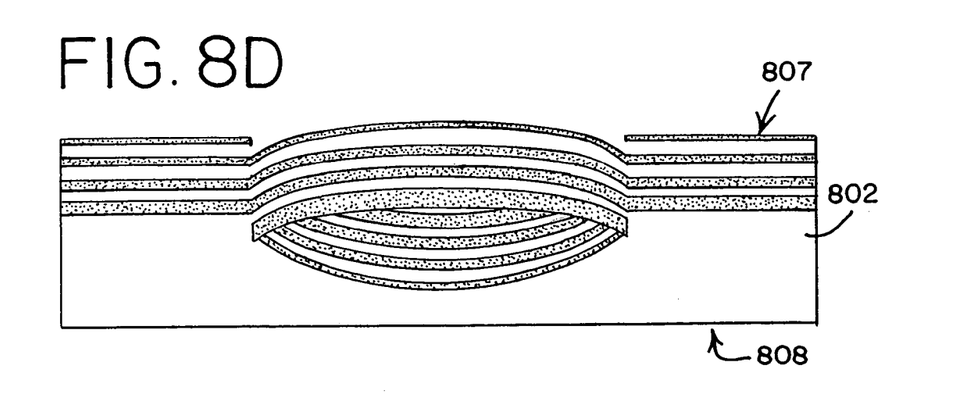

In an alternative embodiment, multiple thin layers may be deposited on a non planar substrate surface. There are various ways to reshape a flat substrate surface into other kinds of surface profiles. For example, known micro machining techniques can be used to create a curved surface. Gray scale masks can also be used to create a surface relief pattern on a photoresist film, and such a pattern can be transferred downward to another material below the photoresist film. As is illustrated in FIG. 8, a U-shaped groove 801 can be created in a substrate 802, and a multilayer film 804 made of alternating layers of two materials can be deposited in the U groove (FIG. 8A). A planarization processing step can be used to create the bottom half 805 of a two-dimensional GRIN lens (FIG. 8B). A gray scale mask can be used to make a convex surface profile 806 on the existing half-GRIN structure 805 (FIG. 8C), and more layers 807 can be deposited on top of the convex surface to make a two-dimensional GRIN lens 808 (FIG. 8D) for light focusing applications in which focusing light in both the horizontal and vertical directions is desired. Gray scale mask techniques are used in microlens fabrication and are described in the above referenced co-pending U.S. patent application Ser. No. 10/083,674.

It should be noted that structures other than alternating layers of two materials could be used. For instance, a third material (or more) could be added in some alternative embodiments. In another alternative embodiment, small size grains or dots of one material are embedded in another material with the grains or dots having different density and/or grain size distributions in different parts of the material. Also, wires of one material can be embedded into another material, with the wires having a desired distribution of density or size. In addition, a combination of embedded grains and wires could be used, and this could be further combined with thin layers. Thus, any mixture of small size structures may be used to create graded refractive index devices suitable for various applications.

A variety of materials can also be used, including amorphous and polycrystalline materials. For example, silica ($SiO_2$, n=1.45) and titania ($TiO_2$, n=2.35) are in common use for making thin film filters for optical fiber communication applications. Due to their relatively large refractive index difference (about 0.9), they can be used to create effective graded refractive index devices for many light focusing applications. A number of other materials may also be used, such as tantalum pentoxide ($Ta_2O_5$), zirconium oxide ($ZrO_2$), niobium pentoxide ($Nb_2O_5$), hafnium oxide ($HfO_2$), zinc oxide (ZnO), germanium oxide ($GeO_2$), lead oxide (PbO), yttrium oxide ($Y_2O_3$), aluminum oxide ($Al_2O_3$), silicon carbide (SiC), titanium carbide (TiC), titanium nitride (TiN), chromium nitride (CrN), carbon nitride (CN), carbon boride (CB), aluminum nitride (AlN), zinc selenide (ZnSe), barium fluoride ($BaF_2$), magnesium fluoride ($MgF_2$), diamond like carbon (DLC), silicon (Si), germanium (Ge), polyimide, bisbenzocyclobutene (BCB) and cyclized transparent optical polymer (CYTOP). It should be noted that the refractive index of some of these materials is quite large (e.g., for silicon, n=3.4). The choice of materials can be varied, depending on the particular application.

One advantageous choice of materials is silicon (Si) and silica ($SiO_2$). When Si is combined with $SiO_2$, the effective refractive index of the resulting medium can vary by as much as about 1.9. This large variation, combined with the high refractive index of silicon, may be useful in some applications because of the short focal length and small spot size (0.4 μm in one simulation) that can be achieved.

GRIN devices according to embodiments of the present invention may be used in any application where there is a need to focus a light beam into a small spot size. For example, such couplers can be used to focus light from a single mode optical fiber into a III-V semiconductor waveguide, in place of objective lenses or lens tipped fibers. Through proper selection of the refractive index distribution, mode matching to the fiber and the semiconductor waveguide can be achieved. Such devices can be fabricated on a substrate as part of an integrated coupler structure that includes a U-groove or V-groove for holding an optical fiber and a photonic chip mounting recess for holding the semiconductor waveguide. Some examples of such optical coupling systems are described in detail in the above referenced co pending U.S. patent application Ser. No. 10/651,372. Still further examples are described in detail in the above referenced co pending U.S. patent application Ser. No. 10/083,674.

In addition to light beam focusing, GRIN devices according to embodiments of the present invention can also be used in other applications. For instance, in many near field optics applications, transformation of a light beam from a mode profile corresponding to a standard single mode optical fiber to a smaller mode size is generally achieved by tapering the fiber to asmall tip (e.g., tens of nanometers) at one end and coating the outside of the tapered region with a metal film to prevent light from escaping. In general, most of the light (as much as 99.99%) is lost during this beam size transformation process. Replacing such tapered fibers with GRIN devices according to embodiments of the present invention can improve the transmission efficiency substantially.

Another application relates to optical data storage, where the storage density can be limited by the spot size of light beams used to record and/or read the data. In existing optical storage devices, discrete optical elements (prisms, lenses, wave plates, etc.) are used to make the optical head and to focus a light beam from a semiconductor laser to a spot size of a few microns. Using a GRIN device according to an embodiment of the present invention, the focused spot size can be made much smaller, and the storage density can be substantially increased. In addition, discrete optical elements can also be replaced with planar light wavecircuit based integrated optics.

It will also be appreciated that GRIN devices according to embodiments of the present invention allow for fine control and tuning of the refractive index and refractive index distribution to achieve a precise, arbitrary refractive index profile, thereby allowing precise shaping of the optical spot size and mode (wavefront) profile of transmitted light. Thus, such multilayer devices are also suitable for use in a variety of optical applications, including applications where the difference in refractive index is small (e.g., less than 0.2).

The physical size of the GRIN device can also be varied. For example, a two material device could be constructed for coupling light between a semiconductor laser or detector and a standard multimode fiber, which typically has a mode size of about 50 to 65 microns. It can also be used to couple light from a one dimensional or two dimensional semiconductor laser array or laser bar into a single mode fiber, e.g., for optically pumping an erbium doped fiber amplifier.

It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A light transforming device having a graded index of refraction, comprising:
   a body made substantially of a first amorphous material,
   the body having embedded therein a plurality of discrete structures comprising a second amorphous material, each of the discrete structures having a size in at least one dimension substantially smaller than an effective wavelength of light in the second material,
   wherein the first material has a first index of refraction and the second material has a second index of refraction different from the first index of refraction by at least $\Delta n=0.5$, and
   wherein the size of the discrete structures in the at least one dimension is different in a first local region of the body than in a second local region of the body, thereby providing a graded index of refraction.

2. The light transforming device of claim 1, wherein the discrete structures include grains having a size in three dimensions that is substantially smaller than an effective wavelength of light in the second material.

3. A light transforming device having a graded index of refraction, comprising:
   a plurality of alternating layers of a first amorphous material having a thickness and a second amorphous material, each layer of the second material having a thickness substantially less than an effective wavelength of light in the second material, the first material having a first index of refraction, the second material having a second index of refraction different from the first index of refraction by at least Δn=0.5, the plurality of alternating layers forming a light transforming medium with an effective index of refraction in a local region that depends on a local ratio of a volume of the layers of the first material to a volume of the layers of the second material, wherein a graded effective index of refraction along a direction transverse to the layers is formed by varying the thicknesses of the layers.

4. The light transforming device of claim 3, wherein the thickness of each layer of the second material is less than one-tenth the effective wavelength of light in the second material.

5. The light transforming device of claim 3, wherein each layer of the first material has a thickness substantially less than an effective wavelength of light in the first material.

6. The light transforming device of claim 5, wherein the thickness of each layer of the first material is less than one-tenth the effective wavelength of light in the first material.

7. The light transforming device of claim 3, wherein the thickness of each layer is controlled to within 0.5 nm and the effective index of refraction is controlled to within 0.005.

8. The light transforming device of claim 3, wherein at least one of the first material and the second material is an amorphous material.

9. The light transforming device of claim 8, wherein the first material comprises silicon dioxide and the second material comprises tantalum pentoxide.

10. The light transforming device of claim 8, wherein the first material comprises silicon dioxide and the second material comprises titanium dioxide.

11. The light transforming device of claim 3, wherein the first material comprises silicon dioxide and the second material comprises silicon.

12. The light transforming device of claim 3, wherein at least one of the first material and the second material is a polycrystalline material.

13. The light transforming device of claim 3, wherein the layers are substantially planar.

14. The light transforming device of claim 3, wherein the graded effective index of refraction is a parabolic function of position along the direction transverse to the layers.

15. The light transforming device of claim 3, wherein the device has a length such that light having a large mode size entering at a first end of the device and propagating longitudinally through the device is focused to a small mode size at a second end of the device.

16. The light transforming device of claim 15, wherein the small mode size is less than 1 μm.

17. The light transforming device of claim 3, wherein the device has a length such that light having a large mode size entering at a first end of the device and propagating longitudinally through the device is focused to a small mode size at a focal point outside a second end of the device.

18. The light transforming device of claim 3, wherein the small mode size is less than 1 μm.

19. The light transforming device of claim 3, wherein the effective index of refraction varies such that a mode profile of light propagating through the device is transformed from a first mode profile substantially matching a mode profile for light propagating in a single mode fiber to a second mode profile substantially matching a mode profile for light propagating in a semiconductor waveguide.

20. A light transforming device having a graded index of refraction, comprising:

a plurality of alternating layers of a first amorphous material having a thickness and a second amorphous material, each layer of the second material having a thickness substantially less than an effective wavelength of light in the second material, the first material having a first index of refraction, the second material having a second index of refraction different from the first index of refraction, the plurality of alternating layers forming a light transforming medium with an effective index of refraction in a local region that depends on a local ratio of a volume of the layers of the first amorphous material to a volume of the layers of the second amorphous material, wherein a graded effective index of refraction along a direction transverse to the layers is formed by varying the thicknesses of the layers.

21. The light transforming device of claim 20, wherein the thickness of each layer of the second material is less than one tenth the effective wavelength of light in the second material.

22. The light y transforming device of claim 20, wherein the thickness of each layer is less than one-tenth the effective wavelength of light in the respective material.

23. The light transforming device of claim 20, wherein the second index of refraction is different from the first index of refraction by at least 0.2.

24. The light transforming device of claim 20, wherein the thickness of each layer is controlled to within 0.5 nm and the effective index of refraction is controlled to within 0.005.

25. The light transforming device of claim 20, wherein the first material comprises silicon dioxide and the second material comprises titanium dioxide.

26. The light transforming device of claim 20, wherein the first material comprises silicon dioxide and the second material comprises silicon.

27. The light transforming device of claim 20, wherein the first material comprises silicon dioxide and the second material comprises tantalum pentoxide.

28. The light transforming device of claim 20, wherein the layers are substantially planar.

29. The light transforming device of claim 20, wherein the graded effective index of refraction is a parabolic function of position along the direction transverse to the layers.

30. The light transforming device of claim 20, wherein the device has a length such that light having a large mode size entering at a first end of the device and propagating longitudinally through the device is focused to a small mode size at a second end of the device.

31. The light transforming device of claim 30, wherein the device has a length such that light having a large mode size entering at a first end of the device and propagating longitudinally through the device is focused to a small mode size at a focal point outside a second end of the device.

32. The light transforming device of claim 30, wherein the small mode size is less than 1 μm.

33. The light transforming device of claim 20, wherein the effective index of refraction varies such that a mode profile of light propagating through the device is transformed from a first mode profile substantially matching a mode profile for light propagating in a single mode fiber to a second mode profile substantially matching a mode profile for light propagating in a semiconductor waveguide.

* * * * *

UNITED STATES PATENT AND TRADEMARK OFFICE
CERTIFICATE OF CORRECTION

PATENT NO. : 7,426,328 B2
APPLICATION NO. : 10/652269
DATED : September 16, 2008
INVENTOR(S) : Yan Zhou et al.

Page 1 of 1

It is certified that error appears in the above-identified patent and that said Letters Patent is hereby corrected as shown below:

In the Claims

In column 18, claim 22, line 24, after "The light" delete "y".

Signed and Sealed this

Twelfth Day of May, 2009

JOHN DOLL
*Acting Director of the United States Patent and Trademark Office*